March 26, 1946.   M. NEWMAN   2,397,197
ELECTROSTATIC PRECIPITATOR APPARATUS
Original Filed Oct. 30, 1943
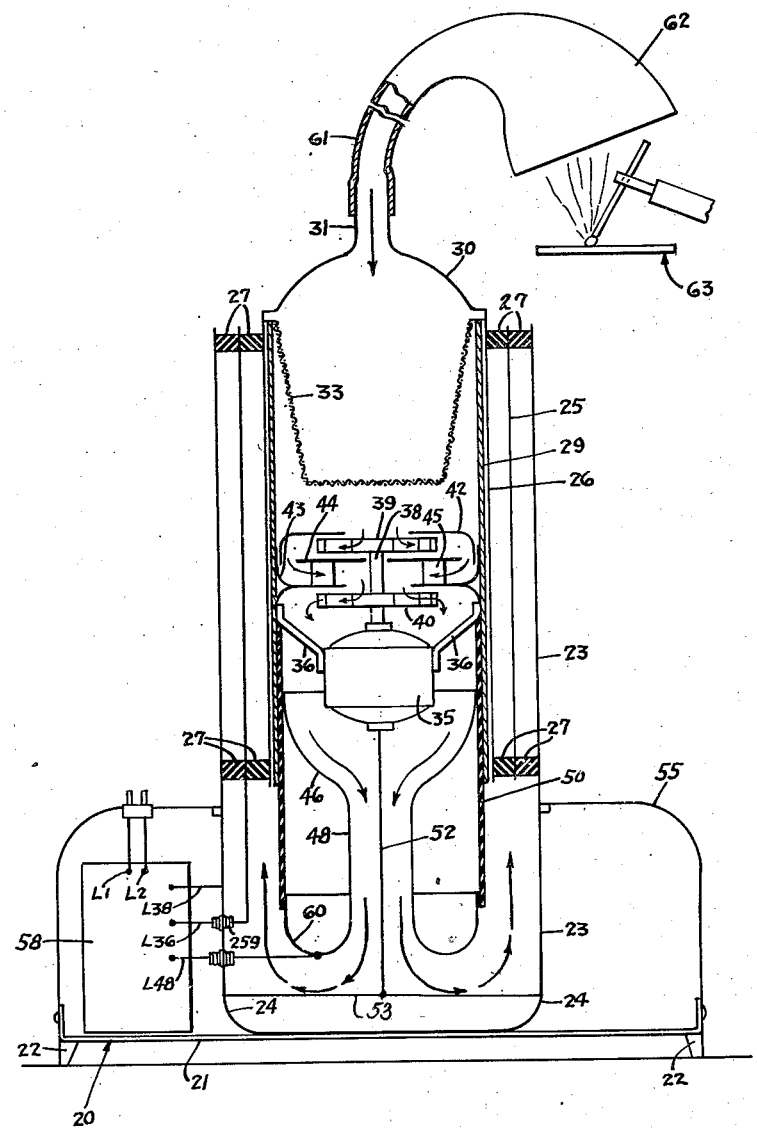
INVENTOR
MORRIS NEWMAN
By Paul, Paul & Moore
ATTORNEYS Patented Mar. 26, 1946

2,397,197

UNITED STATES PATENT OFFICE 2,397,197

ELECTROSTATIC PRECIPITATOR APPARATUS

Morris Newman, Minneapolis, Minn.

Original application October 30, 1943, Serial No. 508,336. Divided and this application August 10, 1944, Serial No. 548,901

3 Claims. (Cl. 183—7)

This invention relates to a dust and smoke precipitating apparatus which is especially suitable for use in portable installations, such as for purifying the contaminated air resulting from grinding or welding operations. In many delicate machine operations, the small particles of abrasive thrown off by grinding wheels are sufficiently contaminating to cause maladjustment or excessive wear of the finished products and the machines used in making them. Likewise in welding operations, particularly in closed quarters, the smoke and fumes caused by the welding operations are hazardous to the operator and sometimes constitute a serious impairment with respect to the products produced.

It is an object of the present invention to provide a precipitator apparatus of improved design and more particularly a portable apparatus suitable for installation adjacent to machine tools or in enclosed quarters for the cleaning of air therein.

Other and further objects of the invention are those inherent in the apparatus herein illustrated, described and claimed.

The invention is illustrated in the drawing which is a side elevational view in section of the precipitator apparatus taken at the center line of the apparatus.

Referring to the drawing the precipitator apparatus comprises a base generally designated 20, having a sub-frame 21 provided with feet 22. Upon the sub-frame there is mounted a cylindrical shell 23, having a curved bottom as shown at 24—24. The cylindrical shell extends upwardly and contains concentric cylindrical plates 25 and 26, which are maintained in spaced concentric relationship by a plurality of insulators 27. The outer cylindrical member 23 and the inner cylindrical member 26 are electrically connected together and are grounded to the frame 20 of the machine. Within the inner cylindrical member 26 and upon it there is suspended a sleeve 29 of substantial construction, having a removable cap 30 provided with a reduced conduit receiving end 31.

Within cylinder 29 and immediate the cap 30, there is a wire screen or cloth pre-filter 33 of any suitable design for collecting and holding particles of large size. Beneath the filter 33, and within the sleeve 29 there is mounted a motor 35 held on brackets 36, attached to the interior of the cylinder 29. The motor is provided with an extending shaft 38 upon which there is mounted a first stage blower 39 and a second stage blower 40. Around the blowers there are positioned curved cowlings 42, 43 and an interior separating plate 44 which is supported on a fixed radial blading 45. When the motor 35 is rotated, the blower elements 39 and 40 pull air through the cap 30 and through the filter 33 in series and thence into the center of the blower element 39, and following the path of the arrows illustrated, over and around the fixed baffle 44 and thence through the blower 40, whereupon the air is discharged around the motor 35 and forced downwardly into a gradually restricting bell-shaped cowling 46 and thence through the straight tubular section 48.

The member 46—48 is preferably of sheet metal and is supported upon an insulating sleeve 50 so that the entire member 46—48 may be charged at a suitably high voltage. Axially arranged within the tubular portion 48 there is positioned an ionizing wire 52 supported at its upper end to the motor 35 and at its lower end by a slightly heavier wire 53. Wire 53 is in turn supported by the lower end of the outer tubular member 23.

It will thus be observed that the motor-driven blower causes the air to be drawn through the pre-filter 33 and thence forced through an ionizing zone composed of wire 52 and electrically charged tubular section 48, whereupon the air is discharged and forced up through an annular space between cylinders 23 and insulator 50 and thence through the annular precipitating plates 23—25—26. The air is discharged through the upper annular space at the top of the apparatus between the concentrical cylinders 23—25—26.

Upon the base 20 there is also mounted an outer cover 25 in which there is positioned a power pack 58 which may be any of the types shown in Figures 2, 3, 4 and 5 of my copending application Ser. No. 508,336, filed October 30, 1943, entitled Electrostatic precipitator systems, and may, if desired, include either of the regulating circuits described in said application with reference to Figures 8 and 9. Electrical connection from a low power alternating current source is made to terminals $L_1$ and $L_2$, and from the power source there extends a common conductor L38 which is electrically connected to the outer cylindrical member 23, and hence also to the inner cylindrical member 26. From the power pack there also extends a high voltage direct current line L36 which passes through bushing 59 and is connected to the cylindrical plate 25, and an ionizing wire connection L48 which, as previously described, is charged with high voltage direct current, preferably having an alternating current component, the wire L48 being connected to the lower curved surface 60 of the member 46—48.

In use, a fixed or flexible conduit 61 is connected to the cap 30 at the nipple 31, and is extended to the machine in which the contaminated air is produced, at which place there is preferably provided an enlarged cowling 62 shaped so as to collect the contaminated air most advantageously. Thus, where the apparatus is used in connection with welding operations, schematically illustrated at 63, the cowling 62 is shaped so as to collect the fumes and smoke arising from the welding work, or where the electrostatic precipitating apparatus is used in connection with a grinder, the cowling 62 is shaped so as to collect most advantageously the abrasive contaminated air in the immediate region of the grinding operation. The contaminated air is accordingly drawn into the cowling 62, thence through conduit 61 and into the cap 30, whereupon it is drawn through the pre-filter 33 which removes any particles of substantial size. The motor-driven blower then forces the air through the ionizing zone composed of wire 52 and tubular plate 48, where the contaminating particles in the air are ionized, whereupon the air is forced upwardly between the electrically charged precipitating plates 23—25—26, where the ionized dust particles are precipitated and held.

The present application is a division of my application Ser. No. 508,336, entitled Electrostatic precipitator system, filed October 30, 1943.

Other and further modifications will be apparent to those skilled in the art without departing from the spirit of the invention illustrated, described and claimed.

What I claim is:

1. A self-contained electrostatic precipitator comprising a circular base, a tube mounted in a vertical position centrally on said base and having an air entrance nipple at its upper end for receiving an air conduit, electrically driven blower means mounted in said tube for drawing air through said air entrance nipple and driving the air downwardly through said tube, an ionizing zone including an electrically conductive ionizing zone cylinder and an ionizing wire arranged axially therein mounted below said blower means in said tube for causing ionization of air passing therethrough, an air deflector in said base for directing air passing through said tube upwardly therearound, a plurality of electrically conductive cylindrical dust precipitator plates arranged in spaced relation concentrically around the tube in the path of the air deflected upwardly, and a power pack mounted in the base for converting low voltage electrical energy to high voltage for electrically charging said dust precipitator plates and ionizing zone cylinder and ionizing wire.

2. A self-contained electrostatic precipitator comprising a base, a tubular housing mounted on the base, an electric motor driven blower contained within the housing, a plurality of coaxially arranged precipitator plates around the periphery of said tubular housing, said blower being connected to move air downwardly thru the housing and thence upwardly around its periphery to the precipitator plates for blowing air therethrough, an ionizing surface arranged ahead of the precipitator so that the air moved by said blower traverses the ionizing surface before going through the precipitating plates and an electrical power-pack mounted in the base energizable from a relatively low voltage source for charging the ionizing surface and precipitator plates at high voltage.

3. An article of manufacture comprising, a frame, a cylindrical housing, an electric-motor driven blower having air inlet and outlet, positioned in said cylindrical housing for moving air therethru, a dust strainer between the blower inlet and one end of the cylindrical housing, a cover on that end of the housing having an air conduit connection thereon, electrostatic precipitator plates of cylindrical form and of a size so as to form an electrostatic precipitator plate section of concentric cylinders with concentric air passage spaces therebetween nested in position around the cylindrical housing, the largest of said concentric cylinders overhanging beyond the end of the cylindrical housing, an air deflecting cover connected over the end of said largest cylinder for directing air from the outlet of said blower back along the outside of the cylindrical housing and thru said electrostatic precipitator plate section, an ionizing electrode in said air path between the blower outlet and the precipitator plate section, and a power pack mounted on the frame and connected to the ionizing electrode and precipitator plates for converting low voltage electrical energy to high voltage for electrically charging the electrode and plates.

MORRIS NEWMAN.